United States Patent [19]
Newsome

[11] Patent Number: 6,152,510
[45] Date of Patent: Nov. 28, 2000

[54] STAKE AND RAIL ASSEMBLY

[76] Inventor: Reginald W. Newsome, 216 Philray Rd., Richmond, Va. 23229

[21] Appl. No.: 09/298,687

[22] Filed: Apr. 23, 1999

[51] Int. Cl.[7] .......................................................... B60P 7/00
[52] U.S. Cl. .................................. 296/10; 296/3; 296/43; 296/50; 296/52
[58] Field of Search ................................... 296/10, 3, 43, 296/50, 52

[56] References Cited

U.S. PATENT DOCUMENTS

| | | | |
|---|---|---|---|
| 1,403,307 | 1/1922 | Fisher | 296/10 |
| 2,726,095 | 12/1955 | Emery | 296/3 X |
| 2,993,727 | 7/1961 | Zewiske | 296/3 X |
| 3,131,962 | 5/1964 | Clair | 296/3 |
| 4,216,988 | 8/1980 | Weiss | 296/10 X |
| 4,585,264 | 4/1986 | Miller | 296/3 |
| 4,703,969 | 11/1987 | Rayburn, Jr. | 296/10 X |
| 5,071,185 | 12/1991 | Schiele | 296/3 |
| 5,398,985 | 3/1995 | Robinson | 296/10 |
| 5,509,709 | 4/1996 | Carroll | 296/3 |

*Primary Examiner*—Joseph D. Pape

[57] ABSTRACT

A stake and rail assembly for increasing the cargo carrying capacity of a pickup truck or the like vehicle comprising: a front wall, a pair of generally parallel side walls, a rear wall and upright stakes for insertion into the cavities in the vehicle or attachment by bolts to the vehicle, wherein the front and side walls comprise a plurality of horizontal rails attached to the stakes to form three sides of an enclosed volume, the rear wall comprises a plurality of horizontal rails, a first pair of angularly mounted members and at least one upright attached to the horizontal rails of the rear wall and capable of engaging a parallel second pair of angularly mounted members and at least one upright on the front wall when the rear wall is vertically juxtaposed with the front wall. According to various preferred embodiments of the invention, 1) the surfaces of the angularly mounted members and the uprights are cut to provide engagement when the front and rear walls are vertically juxtaposed, 2) the ends of all front wall and sidewall rails include slots that engage bolts inserted through holes in two part brackets that serve to join the front wall and side wall rails, and 3) the rear wall includes spring biased locking mechanisms that engage apertures in a second set of brackets attached to the rear extremities of the side walls.

11 Claims, 4 Drawing Sheets

STAKE AND RAIL ASSEMBLY

FIELD OF THE INVENTION

The present invention relates to equipment for increasing the cargo carrying capability of vehicles and more specifically to a stake and rail assembly for increasing the load carrying capability of pick-up trucks and the like.

BACKGROUND OF THE INVENTION

As is well known, pickup trucks are commonly used for hauling light cargo such as crates and boxes. Pickup truck beds are formed of floor and extending side walls and end walls, one of the latter being hinged to form a tailgate. In general, the volume cargo carrying capacity of the truck bed is limited by the height of the extending side walls and end walls.

One means for increasing the cargo capacity of pickup trucks including those having cavities formed in the side walls or corners thereof is to use a stake and rail assembly to increase the height of the extending side and end walls of the truck bed. The stake members of the of the assembly are dimensioned to fit within the cavities of the side walls or corners, when such cavities are present, and rails are then attached extending horizontally between the stakes. Many, if not all, of such stake and rail assemblies are homemade since, to the best of my knowledge, no adjustable "kit" exists that can be purchased and attached to a the relatively broad range of pickup truck beds currently in use.

Two common problems exist with most such homemade stake and rail assemblies. First, although the end wall extension that rides above the front end of the bed may be attached by bolts, fittings or otherwise to the side wall extensions, the end wall extension that rides over the tailgate portion of the bed is either not attached, only loosely attached, or held by a slide bolt or some similar arrangement to the side wall extensions. Thus when the truck is in motion, the wall extension over the tailgate tends to rattle. Second, it is not always desirable to have the entire stake and rail extension package mounted on the vehicle, for example, as when full access to the unextended bed of the truck is desired. In such a case, it becomes necessary to either find an "off-truck" location to store the rear wall extension that rides over the tailgate, or alternatively, to store the same in the bed of the truck either lying down or horizontally against the side of the truck. The latter storage technique uses valuable cargo space, allows the section to slide around in the bed, or provides another source of undesirable noise as the section moves about the bed. The former is inconvenient since the operator must return to the storage location in order to recover and reinstall the section.

OBJECTS OF THE INVENTION

It is therefor an object of the present invention to provide a stake and rail assembly for pickup trucks and other similar cargo carrying vehicles that is easy to install and provides firm and secure attachment of the rear wall extension over the tailgate such that movement thereof and the noise generated thereby is minimized.

It is another object of the present invention to provide such a stake and rail assembly that provides a convenient, secure and "on-board" storage location for the rear wall extension over the tailgate when the same is not in use.

It is yet a further object to provide such a stake and rail assembly that is "universal", i.e. easily adjustable to fit a variety of vehicles with only minor or no modification.

SUMMARY OF THE INVENTION

According to the present invention, there is provided a stake and rail assembly for increasing the vertical cargo carrying capacity of pickup trucks and the like comprising a front end wall, a rear or tailgate end wall and a pair of side walls including stakes that insert into preexisting cavities in the pickup truck side walls or are bolted to the pickup truck side walls, and wherein the tailgate end wall includes a spring biased locking mechanism that engages a locking slot in the rearward portion of each of said pair of side walls to hold the tailgate end wall in firm engagement with both of the side walls, and the tail gate end wall includes a pair of angularly attached members designed to engage a mating pair of angularly attached members on the front end wall when the tailgate end wall is juxtaposed with the front end wall from a vertical position. The incorporation of the just-described features arrests movement of the tailgate end wall while the vehicle is in operation and provides a secure and convenient location for storage of the tailgate end wall when not in use.

DETAILED DESCRIPTION

Figure 1:
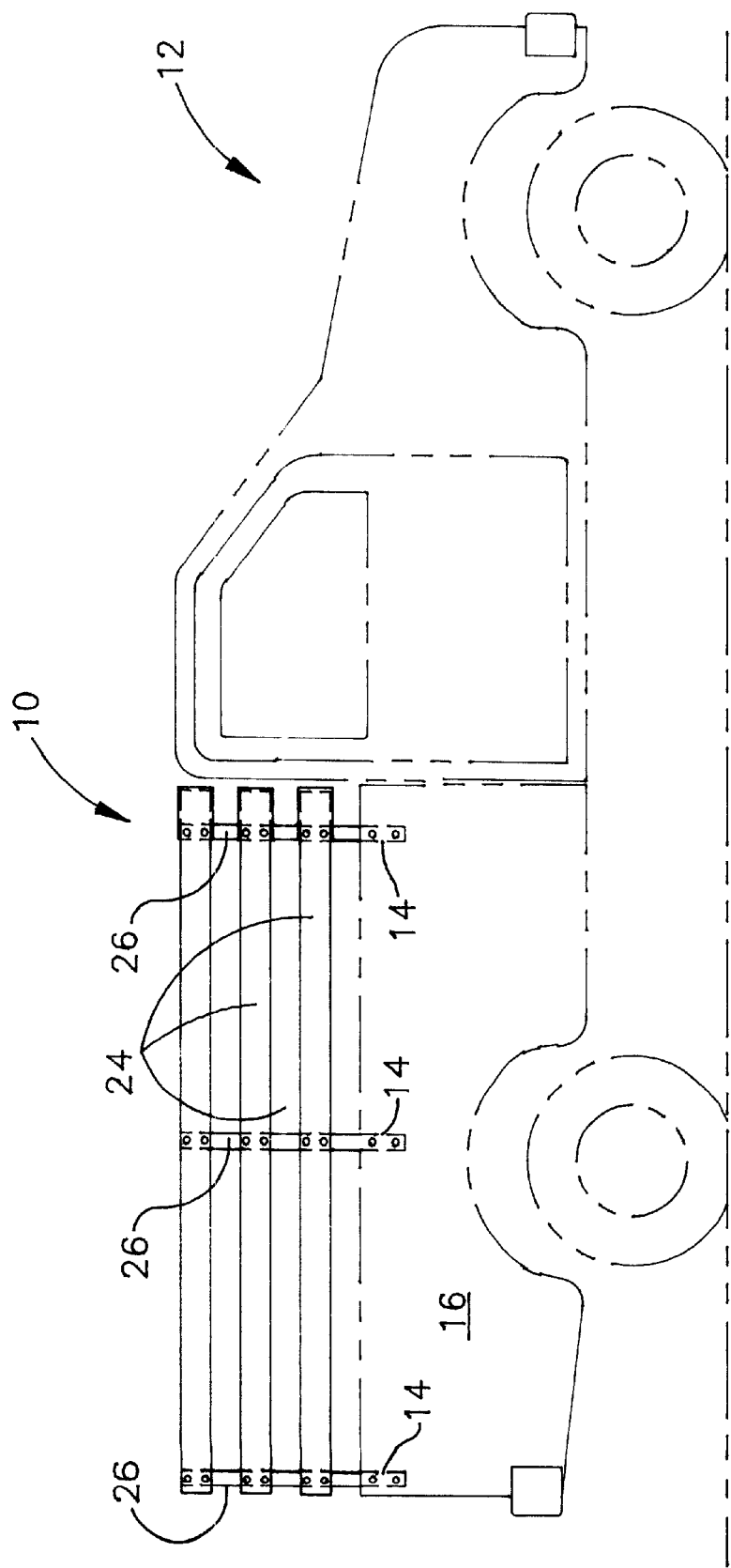
FIG. 1 is a side view of a pickup truck having the stake and rail assembly of the present invention installed thereon.

As shown in FIG. 1, the stake and rail assembly 10 of the present invention is conventionally mounted on a pickup truck 12 having a series of cavities 14 at the corners and along the sides, i.e. in the side walls 16 of its bed. Stake and rail assembly 10 is shown most clearly in FIG. 2 which depicts assembly 10 in its fully assembled condition off of pickup truck 12, but in the same orientation as shown in FIG. 1. As will be noted hereinafter, the presence of cavities to receive the stakes is not essential, as the stakes can be bolted to the side walls of the pickup truck or other vehicle using holes 13 located at the base of all of stakes 26, if appropriate. For purposes of general discussion herein, however, reference will generally be made to insertion into preexisting cavities, it being understood that bolting is an obvious and included optional installation method.

Figure 2:
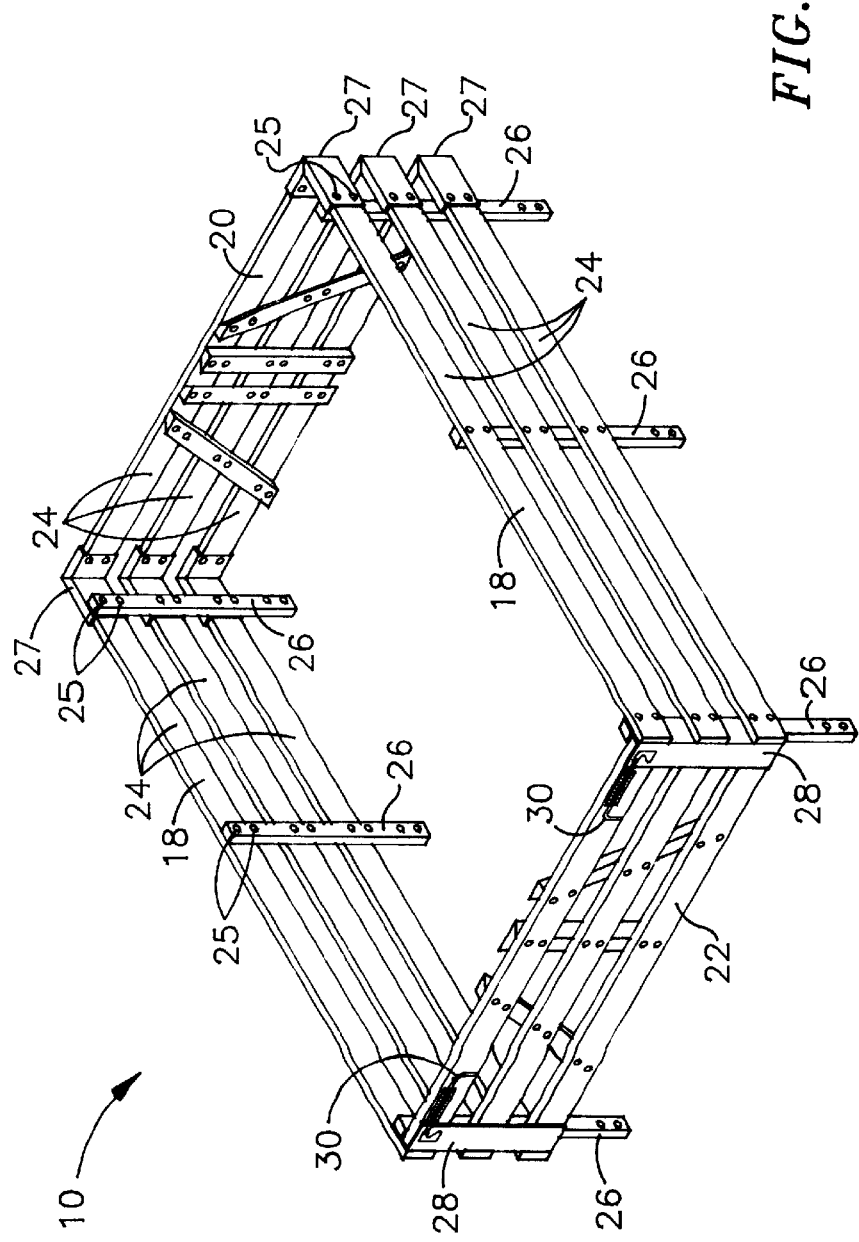
FIG. 2 is a rear perspective view of the stake and rail assembly of the present invention.

As depicted in FIG. 2, stake and rail assembly 10 comprises a pair of side walls 18, a front end wall 20 and a rear or tailgate end wall 22. Each of side walls 18 and front wall 20 include a series of horizontal rails 24 attached to stakes 26 via bolts 25 and/or brackets 27. Stakes 26 are of a size and shape to fit snuggly into cavities 14 in pickup truck 12. The size and number of rails 24 is a matter of choice as is the length of stakes 26, both of these dimensions being determined by the configuration of pickup truck 12 and the additional cargo space one desires to include. In its as-supplied form, the stake and rail assembly of the present invention will have stakes 26 of the longest length required for any installation so that they may be simply cut shorter for installations requiring shorter stakes. When cavities are present, the length of the stake should be such that the stake extends sufficiently into cavity 14 as to provide a snug fit. As mentioned above, stakes 26 include bolt holes 13 for attachment in those instances where the vehicle does not include stake receiving cavities.

Figure 8:
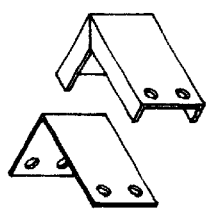
FIG. 8 is an exploded view of an adjustable corner bracket of the type preferred for use in the stake and rail assembly of the present invention.

Bracket 27 is shown in detail in FIG. 8. As shown in the Figure, brackets 27 are comprised of two angular members, a male outer member 33 and a female inner member 23. Male member 33 has flanges 21 of a depth sufficient to contain rail 24, and preferably of an additional depth to receive and retain female member 23. According to a highly preferred embodiment of the invention that provides maximum adjustability, rails 24 in both side walls 18 and front wall 20 include slots 37 in their ends 39 for engagement with bolts inserted through holes 41 in bracket members 33 and 23. The presence of slots 37 permit rails 24 to be inserted into brackets 27 to the appropriate length for the particular vehicle upon which installation is being accomplished and then bolts inserted through holes 41 and slots 37 tightened to provide the required engagement. It is the presence of slots 37 in combination with brackets 27 that provides one element of the adjustability of the stake and rail assembly of the present of the present invention and their inclusion, although not essential is highly preferred. Bracket 27 can be dispensed with entirely if some other means of attaching rails 24 to stakes 26 is utilized. For example, rails 24 can be bolted directly to stakes 26. For reasons of adjustability and rigidity, however, the use of brackets 27 is highly preferred.

Figure 5:
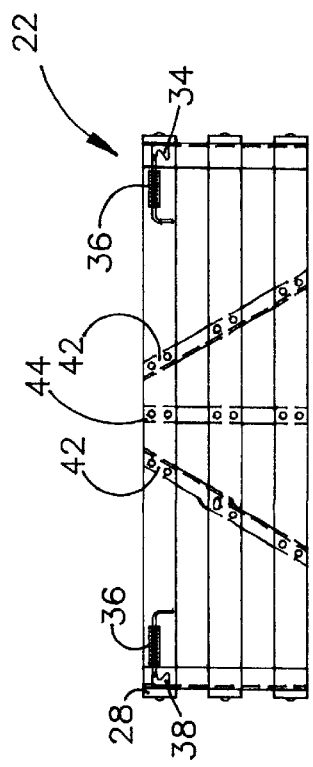
FIG. 5 is a rear view of the tailgate extension portion of the stake and rail assembly of the present invention in its installed position locked to the side walls.

The structure of assembly 10 is generally quite conventional until consideration is directed especially to front wall 20 and rear or tailgate wall 22, and associated brackets 28. The first unique feature of assembly 10 is the inclusion of spring-biased slide locks 30 thereon. The structure of locks 30 is such that one end 31 of shaft 32, shown most clearly in FIGS. 3, 5 and 7, can rotate in an asymmetric aperture 34 at the top of each of brackets 28. Springs 36 serve to force shaft 32 toward the center of rear wall 22 when shaft 32 has been forcibly pushed against spring 36, rotated so that end 31 of shaft 32 is rotated into asymmetric aperture 34 and released, thereby engaging an asymmetric portion 38 of aperture 34 and firmly holding rear wall 22 in position. Additionally, the ends 39 of rails 40 of rear wall 22 are retained behind arms 41 of brackets 28 to further hold rear wall 22 in place. Spring biased lock 36 is released by pushing shaft 32 against spring 36 and rotating shaft 32 so that end 31 can rotate free of asymmetric portion 38. Shaft 32 is then released and spring 36 withdraws end 31 from a position of any possible engagement with aperture 34. Rear wall 22 can then be extracted by moving it vertically. The combination of spring biased lock 36 and retention of rails 40 behind arms 41 serve to firmly and tightly hold rear wall 22 in place in its opeartional configuration.

The second notable feature of rear wall 22 is the inclusion of angularly mounted members 42 and upright 44 thereon. Although these members are shown as being on the inside of rear wall 22, they could just as easily and conveniently be incorporated on the outside wall as will be apparent from the description of their function which follows. It is largely a matter of aesthetics that they are located on the inside of rear wall 22 so that they are not exposed on the exterior when assembly 10 is in use. Additionally, their location on the inside of rear wall 22 makes it unnecessary to rotate rear wall 22 during the process of attaching it to front wall 22 for storage, as described hereinafter. Angularly mounted members 42 and upright 44 serve a dual purpose. First they serve to provide the means of holding rear wall 20 together and also serve to stiffen rear wall 22 much as stakes 26 at about the midpoint of side walls 18 stiffen and provide support for rails 24. More importantly, they serve as one half of the rear wall 22 storage system for keeping rear wall 22 safely and securely stored upon front wall 20 when rear wall 22 is not in use.

Looking now to front wall 20 it can be seen that a matching pair 46 of angularly mounted members and a pair of uprights 48 are mounted upon the inside surface of front wall 20. In addition to providing the previously described stiffening and attachment function, these members are designed to engage members 42 and 44 to provide the secure storage previously alluded to and described hereinafter.

Figure 3:
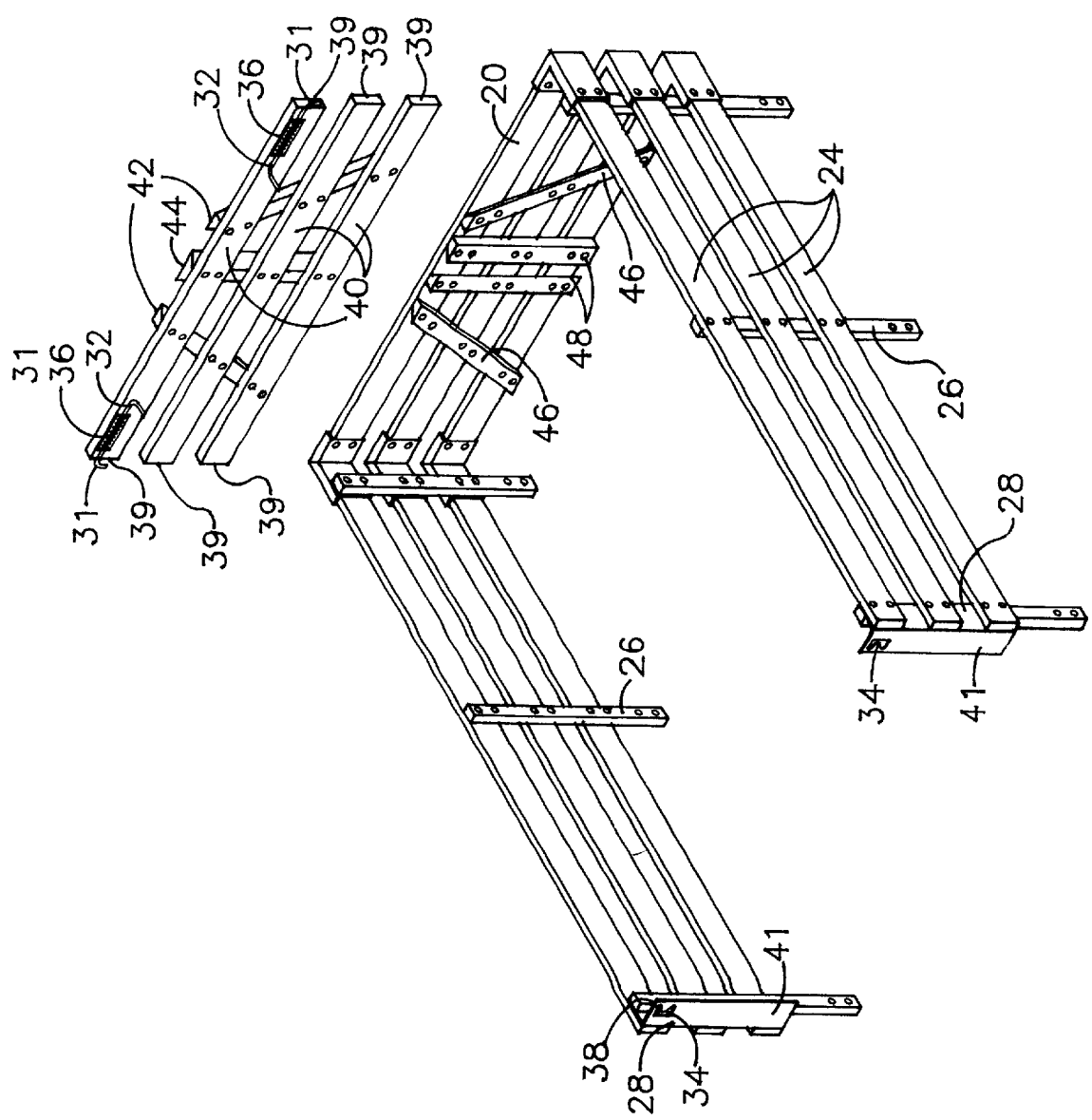
FIG. 3 is a rear perspective view of the stake and rail assembly of the present invention with the tailgate extension about to be placed into the stored position.
Figure 6:
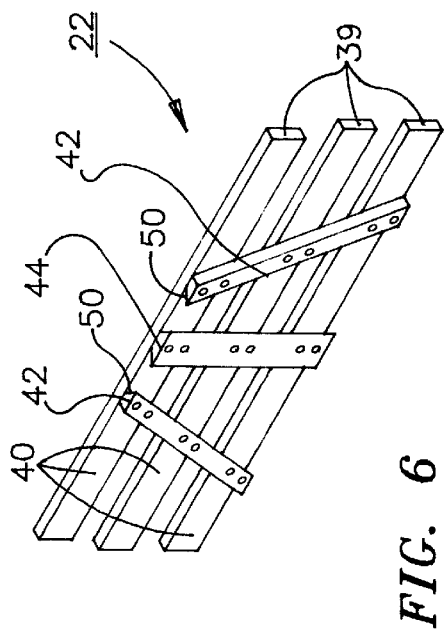
FIG. 6 is a rear view of the front end wall extension of the stake and rail assembly of the present invention.
Figure 7:
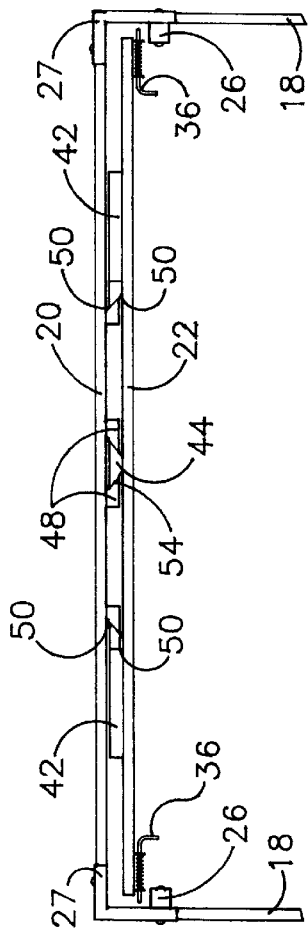
FIG. 7 is a top view of the tailgate extension portion of the stake and rail assembly of the present invention in its stored position upon the front end wall extension.
Figure 4:
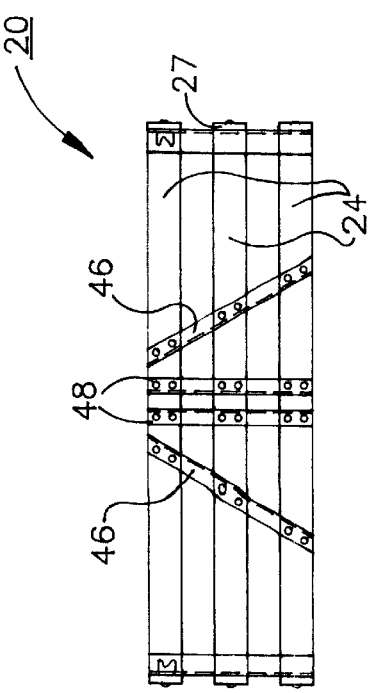
FIG. 4 is a front view of the front end wall extension of the stake and rail assembly of the present invention.

In order to accomplish this storage, the angles at which members 42 and 46 are mounted is such that upon placement of rear wall 22 over, i.e. vertically, and aligned alongside front wall 20, as shown in FIG. 3, members 42 and 46 are parallel and upright 44 lies between uprights 48. As shown in FIG. 7 each of members 42, and 46 preferably includes a biased, beveled or other type of cut surface 50 that provides secure engagement of these members upon dropping, i.e. vertically juxtaposing, of rear wall 22 into parallel proximate relationship with front wall 20. The presence of some type of cut that permits mating of surfaces 50 is essential to the successful practice of the present invention. A shown in FIGS. 2 and 7 a similar beveled or other type of engaging cut along the surface of uprights 44 and 48 as well as upright 44, serve to further tighten the engagement of rear wall 22 with front wall 20 when they are vertically juxtaposed. While the incorporation of beveled or other engaging cut surfaces on uprights 44 and 48 is not critical to the successful practice of the present invention, the use of such cuts is highly preferred.

The particular mounting angle of members 42 and 46 is not particularly critical so long as proper engagement thereof can be achieved. An angle of about 45° has been determined to be fully satisfactory and permitting easy installation and removal of rear wall 22 upon front wall 20 while also preventing rattling of the juxtaposed members 20 and 22.

The angular placement of members 42 and 46 as well as the preferred engagement of uprights 44 and 48 inhibit any lateral movement of rear wall 20 with front wall 22 in the stored condition.

Thus, what has been described is a universally adaptable stake and rail assembly for increasing the cargo carrying capacity of a pickup truck or other similar vehicle that provides a fairly rigid and tight installed assembly and one that also provides for the convenient, safe and secure on board storage of the removable rear wall section that is adjustable.

Stake and rail assembly 10 may be fabricated from any suitable material including metal, plastic and wood. For largely aesthetic reasons, wood is the preferred material. The use of a hardwood such as oak, ash etc. for durability is specifically preferred when wood is the material of choice.

As the invention has been described, it will be apparent to those skilled in the art that the same may be varied in any ways without departing from the spirit and scope thereof Any and all such modifications are intended to be included within the scope of the appended claims.

What is claimed is:

1. A stake and rail assembly for increasing the cargo carrying capacity of a pickup truck type vehicle comprising:
   A) a front wall comprising a plurality of horizontal front wall rails;
   B) a pair of generally parallel side walls comprising a plurality of horizontal side wall rails having front and rear extremities;
   C) a rear wall comprising a plurality of horizontal rear wall rails;
   D) upright stakes;
   E) brackets joining said front wall rails to said front extremities of said side wall rails; and
   F) locking mechanisms joining said rear wall to said rear extremities of said side wall rails;
      said front wall rails and said side wall rails attached to said stakes and forming three sides of an enclosed volume said rear wall forming a fourth side of the enclosed volume when in a use position; and said rear wall including a first pair of angularly mounted members and at least one upright attached to said rear wall rails and said front wall including a second pair of angularly mounted members that are parallel to said first pair of angularly mounted members and at least one upright attached to said front wall rails wherein said first and second pairs of angularly mounted members and said at least one upright of said front and rear walls are engaged so that said rear wall is vertically juxtaposed with said front wall when said rear wall is in a storage position.

2. The stake and rail assembly of claim 1 wherein said brackets comprise right angled male and female members having registering bolt holes, said front wall horizontal rails have right and left extremities, and said front and rear side wall rail extremities and said right and left front wall rail extremities have slots that engage bolts inserted through said registering bolt holes.

3. The stake and rail assembly of claim 2 said male member includes a flange about its interior length of a depth adequate to receive said front wall rail or said side wall rail and the thickness of said female member.

4. The stake and rail assembly of claim 1 wherein said locking mechanism comprises a pair of opposed spring biased locking devices at opposed ends of the topmost horizontal rail that engage apertures in a pair of brackets attached to said rear extremities of said side wall rails.

5. The stake and rail assembly of claim 2 wherein said locking mechanism comprises a pair of opposed spring biased locking devices at opposed ends of the topmost horizontal rail that engage apertures in a pair of brackets attached to said rear extremities of said side wall rails.

6. The stake and rail assembly of claim 2 wherein said first pair and said second pair of angularly mounted members have mating surfaces and said mating surfaces are cut to permit intimate and secure engagement thereof upon vertical juxtaposition of said rear wall with said front wall.

7. The stake and rail assembly of claim 6 wherein said mating surfaces are bevel cut.

8. The stake and rail assembly of claim 2 wherein said rear wall includes a single upright and said front wall includes a pair of uprights and wherein upon vertical juxtaposition of said rear wall and said front wall, said pair of uprights engages said single upright.

9. The stake and rail assembly of claim 8 wherein said each of said uprights includes a mating surface and said mating surfaces are cut to provide intimate and secure engagement thereof when said front and said rear walls are vertically juxtaposed.

10. The stake and rail assembly of claim 9 wherein said mating surfaces are bevel cut.

11. A stake and rail assembly for increasing the cargo carrying capacity of a pickup truck type vehicle having cavities therein for the insertion of stakes to accommodate the addition of load carrying accessories comprising:
   A) a front wall;
   B) a pair of generally parallel side walls having front and rear extremities;
   C) a rear wall; and
   D) upright stakes suitable for insertion into said cavities; said front wall and said side walls comprising a plurality of horizontal rails attached to said stakes to form three sides of an enclosed volume said rear wall forming a fourth side of the enclosed volume when in a use position; and said rear wall including an attachment arrangement that engages a complimentary attachment arrangement on said front wall when said rear wall is vertically juxtaposed with said front wall when said rear wall is in a storage position.

* * * * *